(12) United States Patent
Shaver et al.

(10) Patent No.: US 11,887,226 B2
(45) Date of Patent: Jan. 30, 2024

(54) USING MACHINE LEARNING FOR ICONOGRAPHY RECOMMENDATIONS

(71) Applicant: Capital One Services, LLC, McLean, VA (US)

(72) Inventors: Briana Shaver, Flower Mound, TX (US); Mark Morrison, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 5 days.

(21) Appl. No.: 17/647,523

(22) Filed: Jan. 10, 2022

(65) Prior Publication Data
US 2023/0222714 A1    Jul. 13, 2023

(51) Int. Cl.
| | | |
|---|---|---|
| G06F 17/00 | (2019.01) | |
| G06T 11/60 | (2006.01) | |
| G06F 40/186 | (2020.01) | |
| G06F 40/205 | (2020.01) | |
| G06N 20/00 | (2019.01) | |

(52) U.S. Cl.
CPC ............ *G06T 11/60* (2013.01); *G06F 40/186* (2020.01); *G06F 40/205* (2020.01); *G06N 20/00* (2019.01)

(58) Field of Classification Search
CPC ....... G06T 11/60; G06N 20/00; G06F 40/186; G06F 40/205; G06F 3/04817; G06F 40/30
USPC ......................................................... 715/202
See application file for complete search history.

(56) References Cited

U.S. PATENT DOCUMENTS

| | | | |
|---|---|---|---|
| 10,002,292 B2 | 6/2018 | Guo et al. | |
| 10,817,981 B1 | 10/2020 | Belkin | |
| 2018/0039621 A1* | 2/2018 | Scronce | ............ G06F 3/04817 |
| 2019/0392487 A1* | 12/2019 | Duke | ..................... G06N 3/08 |
| 2020/0073936 A1* | 3/2020 | Jankowski | ............ G06F 40/279 |

FOREIGN PATENT DOCUMENTS

WO    2021/012645 A1    1/2021

OTHER PUBLICATIONS

Su et al., "Deep Learning Logo Detection with Data Expansion by Synthesising Context," arXiv:1612.09322v3, Mar. 16, 2018, 10 Pages.

\* cited by examiner

*Primary Examiner* — Jason T Edwards
(74) *Attorney, Agent, or Firm* — Harrity & Harrity, LLP

(57) ABSTRACT

In some implementations, a recommendation system may input text into a machine learning model that was trained using input specific to an organization associated with the text and was refined using input specific to a portion of the organization. The recommendation system may receive, from the machine learning model, a recommendation indicating one or more visual components, stored in a database associated with the organization, to use with the text. The machine learning model may use natural language processing and sentiment detection to parse the text. Accordingly, the recommendation system may receive the one or more visual components from the database and generate an initial draft including the text and the one or more visual components.

20 Claims, 9 Drawing Sheets

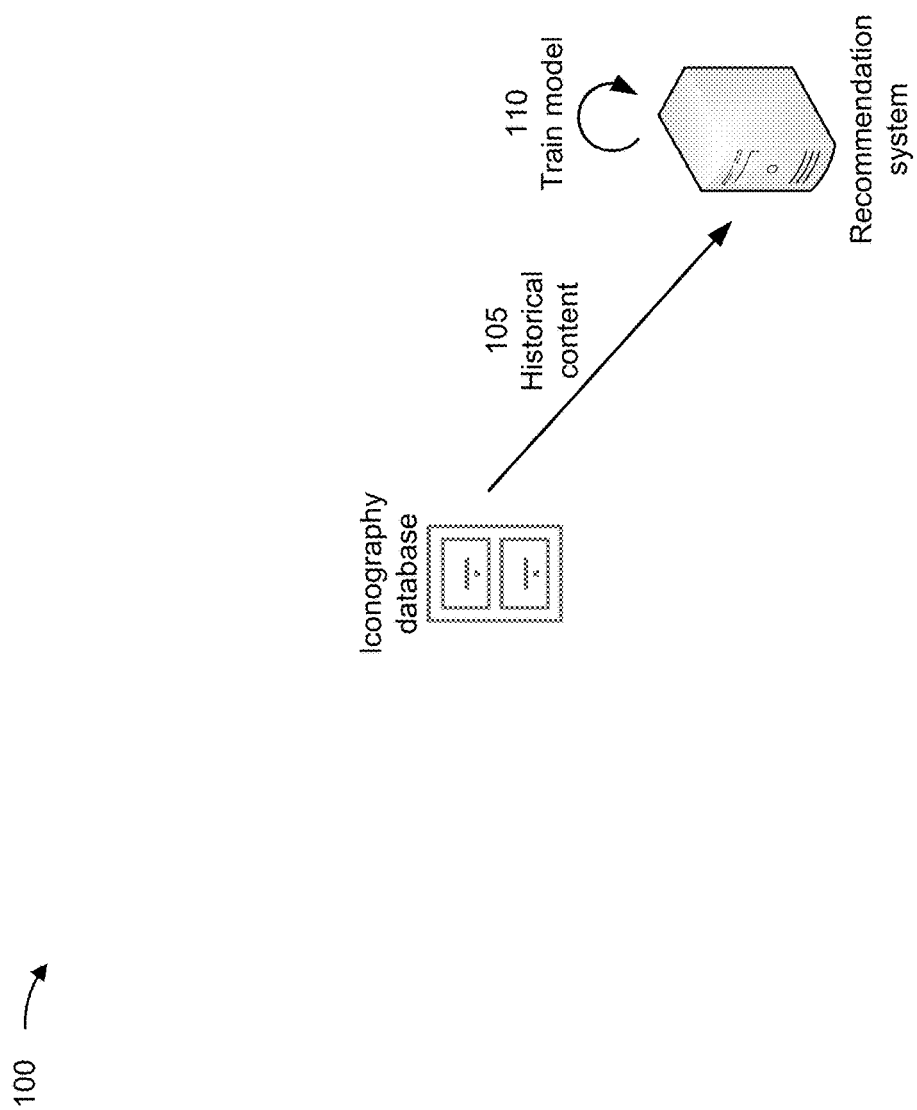

USING MACHINE LEARNING FOR ICONOGRAPHY RECOMMENDATIONS

BACKGROUND

Organizations often own, or have access to, a large database of iconography associated with the organization. For example, images, colors, logos, and other visual components may be included in the database. The database may be indexed for searching (e.g., via keywords).

SUMMARY

Some implementations described herein relate to a system for visual content generation using machine learning. The system may include one or more memories and one or more processors communicatively coupled to the one or more memories. The one or more processors may be configured to input text into a machine learning model, where the model was trained using input specific to an organization associated with the text and was refined using input specific to a portion of the organization. The one or more processors may be further configured to receive, from the machine learning model, a recommendation indicating one or more images, one or more colors, and one or more logos to use with the text, where the one or more images, the one or more colors, and the one or more logos are retrieved from a database associated with the organization, and wherein the machine learning model uses at least natural language processing (NLP) and sentiment detection to parse the text. The one or more processors may be configured to select, based on output from the machine learning model, at least one template associated with the portion of the organization. The one or more processors may be further configured to populate the at least one template using the one or more images, the one or more colors, and the one or more logos.

Some implementations described herein relate to a method of visual content generation using machine learning. The method may include inputting text into a machine learning model, where the model was trained using content specific to an organization associated with the text. The method may further include receiving, from the machine learning model, a recommendation indicating one or more visual components to use with the text, where the one or more visual components are stored in a database associated with the organization. The method may include receiving the one or more visual components from the database. The method may further include generating an initial draft including the text and the one or more visual components.

Some implementations described herein relate to a non-transitory computer-readable medium that stores a set of instructions for visual content generation using machine learning for a device. The set of instructions, when executed by one or more processors of the device, may cause the device to input text into a machine learning model, where the model was trained using content specific to an organization associated with the text. The set of instructions, when executed by one or more processors of the device, may further cause the device to receive, from the machine learning model, a recommendation indicating one or more visual components to use with the text, where the one or more visual components are stored in a database associated with the organization, and the machine learning model uses at least one constraint associated with equal representation. The set of instructions, when executed by one or more processors of the device, may cause the device to receive the one or more visual components from the database. The set of instructions, when executed by one or more processors of the device, may further cause the device to generate an initial draft including the text and the one or more visual components.

BRIEF DESCRIPTION OF THE DRAWINGS

FIGS. 1A-1D are diagrams of an example implementation relating to using machine learning for iconography recommendations.

DETAILED DESCRIPTION

Figure 1B:
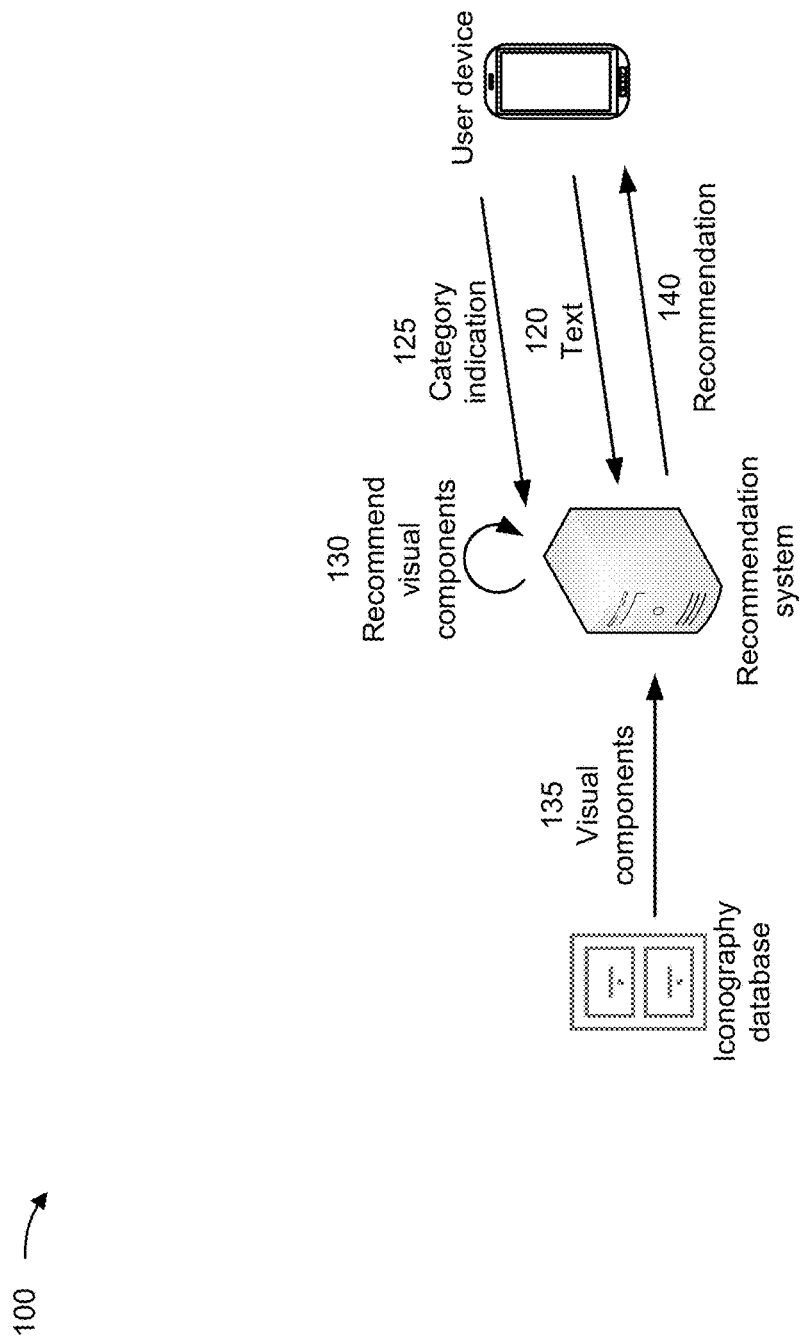

The following detailed description of example implementations refers to the accompanying drawings. The same reference numbers in different drawings may identify the same or similar elements.

Organizations (e.g., corporations, partnerships, and other formal and informal collections of persons) often maintain repositories of iconography for use in documents and other communications associated with the organizations. For example, the repositories may include images (whether owned or licensed by the organizations), logos (whether created or commissioned by the organizations), colors (e.g., approved colors and/or trademarked colors, among other examples), and/or other visual components to use in the communications. To improve searching through the repositories, organizations may index the visual components and provide for keyword searching. However, searching via keywords is computationally costly because the repository scours the indices associated with all visual components for each search.

Some implementations described herein provide for a machine learning model that selects visual components (e.g., from a repository associated with an organization) based on text. For example, the machine learning model may use at least NLP and sentiment detection to recommend visual components for use with the text. As a result, the machine learning model obtains relevant visual components while consuming less memory and processing resources than multiple keyword searches of the entire repository. Additionally, the machine learning model is flexible and may be customized by an organization or even by portions of an organization.

FIGS. 1A-1D are diagrams of an example 100 associated with using machine learning for iconography recommendations. As shown in FIGS. 1A-1D, example 100 includes an iconography database, a recommendation system, and a user device. These devices are described in more detail in connection with FIGS. 3 and 4.

As shown in FIG. 1A and by reference number 105, the recommendation system may receive input (e.g., historical content, such as content that pairs text with images, colors, logos, or a combination thereof) specific to an organization. For example, the recommendation system may receive digital information representing posters, videos, website pages, emails, memoranda, and/or other types of communications stored in association with the organization. In some implementations, the recommendation system may receive the digital information from a repository owned (or at least managed) by the organization. As shown in FIG. 1A, the recommendation system may receive the digital information from an iconography database storing visual components owned (or at least licensed) by the organization. Additionally, or alternatively, the recommendation system may receive the digital information from a separate database that is owned (or at least managed) by the organization.

Accordingly, as shown by reference number 110, the recommendation system may train a machine learning model using the input specific to the organization. The recommendation system may train the machine learning model as described in connection with FIG. 2A. For example, the machine learning model may use feature vectors associated with the organization to make recommendations. Accordingly, the machine learning model captures a "personality" associated with the organization via the feature vectors.

In some implementations, the recommendation system may further refine the machine learning model using input (e.g., historical content, such as content that pairs text with images, colors, logos, or a combination thereof) specific to a portion of the organization. For example, the portion may include a department, a specific team, a specific project, and/or another similar subgroup within the organization. The recommendation system may refine the machine learning model using additional rounds of training as described in connection with FIG. 2A. For example, the machine learning model may apply higher weighting to feature vectors associated with the portion of the organization to make recommendations. Accordingly, the machine learning model favors a "personality" associated with the portion of the organization via weighting.

As shown in FIG. 1B and by reference number 120, the recommendation system may receive text. For example, the user device may transmit the text to the recommendation system (e.g., via one or more networks). Additionally, or alternatively, a user may input the text via an input device (e.g., a touchscreen, a keyboard, and/or another similar hardware component). In some implementations, the text may be included in a file (e.g., a Microsoft® Word file, an Adobe® Photoshop file, and/or another similar file).

In some implementations, and as shown by reference number 125, the recommendation system may additionally receive an indication of a category of content associated with the text. For example, the user device may indicate a selection of a category from a plurality of categories (e.g., a plurality of values, a plurality of classes, and/or another similar plurality of data types or structures). As an alternative, the recommendation system may detect the category of content associated with the text. For example, the recommendation system may detect a category of poster when receiving a portable document format (PDF) file (e.g., with extension .pdf) and/or an image file (e.g., a joint photographic experts group (JPEG) file, a graphics interchange format (GIF) file, a portable network graphics (PNG) file, and/or another type of image file). In another example, the recommendation system may detect a category of memorandum when receiving an open office extensible markup language (XML) file (e.g., with extension .docx). In another example, the recommendation system may detect a category of webpage when receiving a hypertext markup language (HTML) file (e.g., with extension .htm or .html) and/or a cascading style sheets (CSS) file (e.g., with extension .css). In another example, the recommendation system may detect a category of email when receiving an email message file (e.g., with extension .eml, .emlx, .msg, or .mbx).

Accordingly, as shown by reference number 130, the recommendation system may input the text into the machine learning model and receive, from the machine learning model, a recommendation. The recommendation may indicate one or more visual components (e.g., one or more images, one or more colors, and/or one or more logos) to use with the text.

As described above, the machine learning model may use vectors that are at least partially unique to the organization. For example, as described in connection with FIG. 2A, the machine learning model may undergo supervised training using the vectors that are at least partially unique to the organization and a training set including content specific to the organization. Accordingly, the machine learning model may extract values for the vectors from the text input by the user device to determine the recommendation. In some implementations, as described above, the machine learning model may further use vectors that are at least partially unique to the portion of the organization. For example, as described in connection with FIG. 2A, the machine learning model may undergo supervised training using the vectors that are at least partially unique to the portion of the organization and a training set including content specific to the portion of the organization. Accordingly, the machine learning model may extract values for the vectors from the text input by the user device to determine the recommendation.

In some implementations, the machine learning model may use at least natural language processing (NLP) and sentiment detection to parse the text. Accordingly, the machine learning model may use output from NLP and sentiment detection to form the feature vectors described above. For example, one feature vector may include all nouns identified by NLP, and another feature vector may include all verbs identified by NLP, among other examples. Additionally, or alternatively, one feature vector may include a score (or other value) based on a level of happiness extracted via sentiment detection, and another feature vector may include a score (or other value) based on a level of sadness extracted via sentiment detection, among other examples. Other feature vectors may indicate a prevalence and/or a recurrence associated with one or more keywords.

Additionally, or alternatively, the machine learning model may be trained using deep learning on text included in the content specific to the organization. Accordingly, the machine learning model may develop feature vectors, associated with the organization, using unsupervised learning. In some implementations, the machine learning model may be refined using deep learning on text included in the content specific to the portion of the organization. Accordingly, the machine learning model may develop feature vectors, associated with the portion of the organization, using unsupervised learning.

In any of the implementations described above, the machine learning model may use a constraint (e.g., at least one constraint) associated with equal representation. For example, the machine learning model may be constrained to select images with equal representation across dimensions like race, sex, sexual orientation, and/or gender identity, among other examples. The constraint may apply across all recommendations and/or across subsets of recommendations. For example, the machine learning model may apply one constraint to all recommendations associated with one keyword (e.g., "mortgage") and apply a separate constraint to all recommendations associated with a separate keyword (e.g., "personal loan"). Additionally, or alternatively, the machine learning model may apply one constraint to all recommendations associated with one category of content (e.g., posters) and apply a separate constraint to all recommendations associated with a separate category of content (e.g., webpages).

Additionally, or alternatively, the machine learning model may use a constraint (e.g., at least one constraint) associated with a compliance rule. For example, the machine learning model may be constrained to select particular logos for inclusion with text that includes particular keywords (e.g., an "Equal Housing" logo in association with the keyword "mortgage" or a "Federal Deposit Insurance Corporation" logo in association with the phrases "savings account" or "checking account"), among other examples.

Additionally, or alternatively, the machine learning model may use a constraint (e.g., at least one constraint) associated with the organization. For example, the machine learning model may be constrained to select particular logos and/or colors for inclusion with particular categories of content (e.g., one subset of logos and/or colors for webpages and a different subset of logos and/or colors for emails, or one subset of logos and/or colors for content internal to the organization and a different subset of logos and/or colors for content external to the organization, among other examples). In another example, the machine learning model may be constrained to select particular logos and/or colors based on which portion of the organization input the text to the model (e.g., one subset of logos and/or colors for one department and a different subset of logos and/or colors for another department).

The constraints described herein may be based, at least in part, on previous outputs from the machine learning model. For example, the machine learning model may recommend different images depending on properties of images that were recommended in previous iterations (e.g., to comply with the constraints described above). As a result, the machine learning model may be a recurrent neural network (RNN) or another type of machine learning model with long-term memory functionality.

As shown by reference number 135, the recommendation system may retrieve the visual component(s) from a database associated with the organization. For example, the recommendation system may use indices output by the machine learning model to receive, from the database, files and/or other data structures including the images, logos, colors, and/or other visual components recommended by the model. As shown in FIG. 1B, the recommendation system may receive the visual component(s) from the iconography database storing visual components owned (or at least licensed) by the organization.

In some implementations, each visual component stored in the database may be associated with keywords (e.g., one or more keywords). Accordingly, the machine learning model may use the keywords when generating the recommendation (e.g., based on which keywords best correspond to the extracted feature vectors from the text and, optionally, satisfy any constraints built into the model). As a result, the machine learning model may output the indices corresponding to the visual components that were selected, at least in part, based on associated keywords.

Accordingly, as shown by reference number 140, the recommendation system may output an indication of the recommendation to the user device. For example, the recommendation system may output the index or indices corresponding to the visual component(s). As a result, the user device may retrieve the recommended visual component(s) from the iconography database using the index or indices, which uses significantly fewer computing resources as compared with the user device performing multiple keyword searches on the iconography database. Additionally, or alternatively, the recommendation system may output the files or other data structures retrieved from the iconography database (e.g., as described in connection with reference number 135). As a result, the recommendation system may retrieve the recommended visual component(s) from the iconography database using the index or indices, which uses significantly fewer computing resources as compared with the user device performing multiple keyword searches on the iconography database.

Figure 1C:
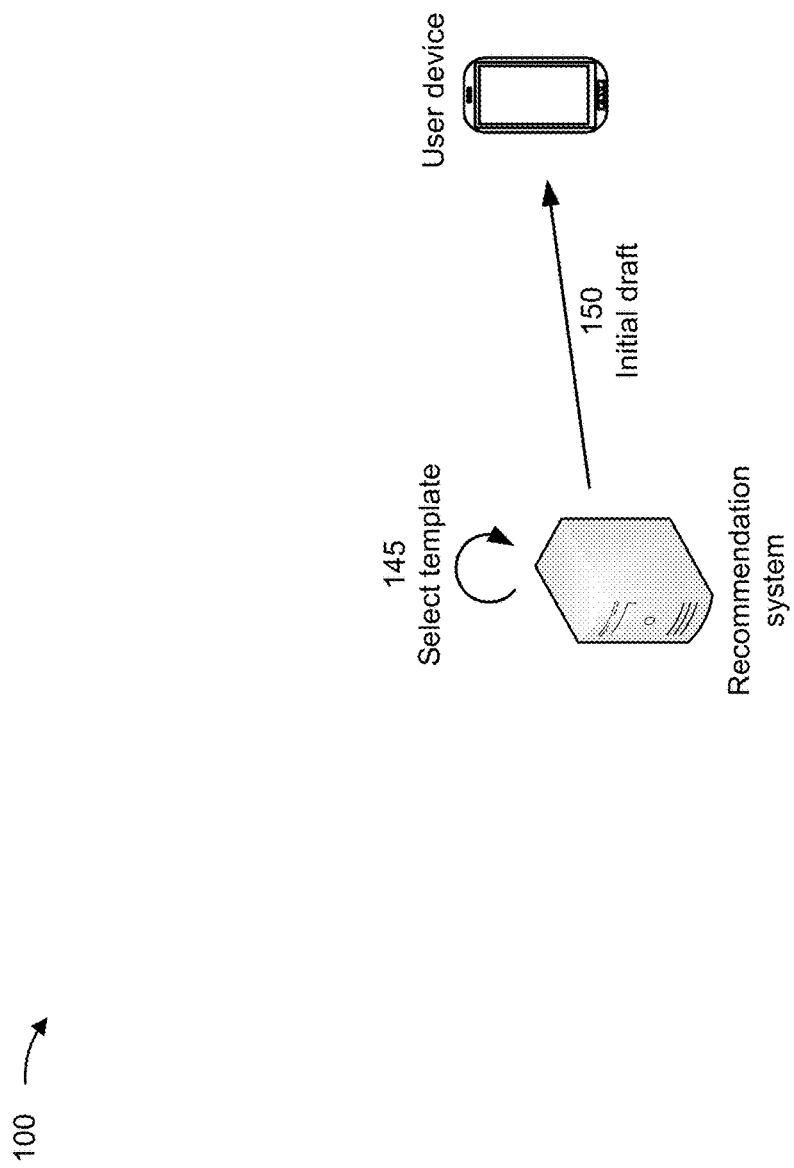

Additionally, or alternatively, and as shown in FIG. 1C and by reference number 145, the recommendation system may select, based on output from the machine learning model, a template (e.g., at least one template) associated with the organization (or with the portion of the organization). For example, a plurality of templates may be associated with different feature vectors, and the recommendation system may select the template with associated feature vectors that are a smallest distance from the feature vectors output by the machine learning model. Accordingly, the machine learning model may select the template based on at least one of the input specific to the organization (and/or the input specific to the portion of the organization).

Additionally, or alternatively, the recommendation system may select the template based on the indication of the category associated with the text (e.g., as described in connection with reference number 125). For example, one subset of templates may be associated with a category of webpages, another subset of templates may be associated with a category of posters, and so on. Accordingly, the recommendation system may select a template (e.g., as described above) from the subset corresponding to the category associated with the text. As an alternative, the recommendation system may randomly select a template from the subset corresponding to the category associated with the text.

"Template" refers to a data structure (such as a file) that includes one or more location indicators (e.g., relative to a size in pixels, relative to a size in inches or centimeters, and/or relative to another measurement associated with a product represented by the data structure), where each location indicator is associated with a color, a logo, an image, text, and/or another type of content for insertion according to the location indicator. A location indicator may be associated with a singular location (e.g., for a logo and/or an image), an area (e.g., for text, a logo, and/or an image), or a portion of the product (e.g., a fraction of the product for a color to be used as background or a fraction of the product where inserted text will use a color as foreground).

Examples of templates may include a Microsoft® Word template (e.g., with a .dotx, a .dotm, or a .dot extension), an Adobe® Photoshop template (e.g., with a .psd or .psb extension), a GIMP template (e.g., with a .xcf extension), and/or an OpenOffice® template (e.g., with a .ott extension), among other examples. Other examples may include images or other data structures stored in associated with a separate data structure (such as a separate file) that includes the location indicator(s). For example, a template may include a PDF file or an image file (e.g., a JPEG file, a GIF file, a PNG file, and/or another type of image file), among other examples, stored in associated with a data structure indicating one or more locations in the template and one or more types of content for insertion according to the location(s).

In some implementations, the recommendation system may generate templates based on the input specific to the organization (and/or the input specific to the portion of the organization). For example, the recommendation system may abstract historical content associated with the organization based on which positions within the content have images, which positions have logos, and which positions have text, among other examples. The recommendation system may generate a set of templates from which a template is selected each time the model is run (e.g., as described above). Alternatively, the recommendation system may generate a new template each time the model is run.

Accordingly, the recommendation system may generate an initial draft including the text and the visual component(s). In some implementations, the recommendation system may populate the template (e.g., selected and/or generated as described above) using the visual component(s) recommended by the machine learning model. For example, the recommendation system may insert the text into at least a first position on the initial draft and insert the visual component(s) into at least a second position on the initial draft.

As shown by reference number 150, the recommendation system may output the initial draft to the user device. For example, the recommendation system may output a file or another data structure that includes the initial draft.

In some implementations, the user device may transmit, and the recommendation system may receive, feedback associated with the initial draft. For example, the user device may transmit the feedback to the recommendation system (e.g., via one or more networks). Additionally, or alternatively, a user may input the feedback via an input device (e.g., a touchscreen, a keyboard, and/or another similar hardware component). In some implementations, the feedback may include a binary (e.g., thumbs up or thumbs down) and/or a quality score (e.g., on a scale of 1 to 5, a scale of 1 to 10, a letter grade, and/or another type of score), among other examples.

Accordingly, the recommendation system may update the machine learning model based on the initial draft and the feedback. For example, the feature vectors associated with the initial draft may be weighted higher when the feedback is positive (e.g., a positive in a binary or satisfying a threshold for positive) or weighted lower when the feedback is negative (e.g., a negative in a binary or satisfying a threshold for negative). In another example, the initial draft may be added to a training set with the feedback, and the recommendation system may undergo one or more rounds of additional training (e.g., as described in connection with FIG. 2A) using the training set.

Figure 1D:
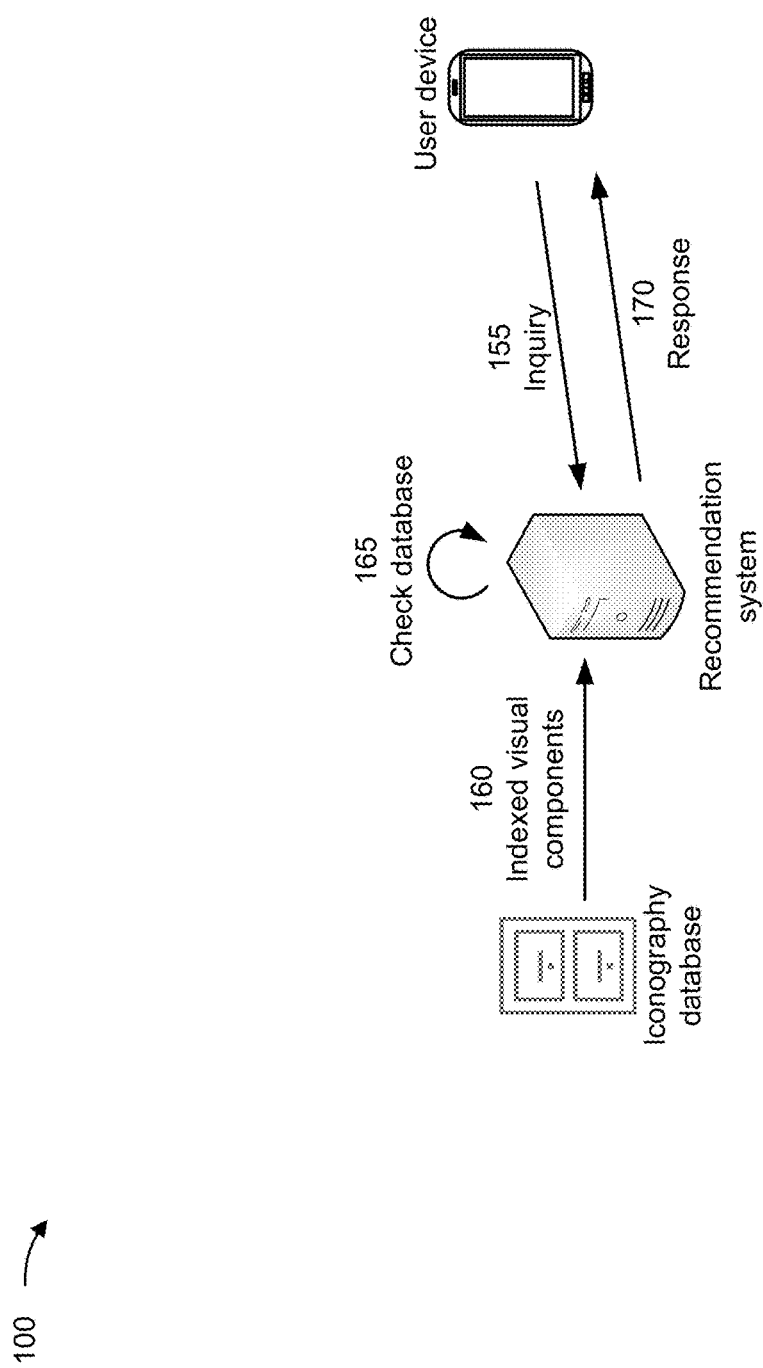

As shown in FIG. 1D, the recommendation system may additionally process inquiries associated with the iconography database. For example, as shown by reference number 155, the user device may transmit, and the recommendation system may receive, an inquiry associated with the database. The inquiry may include a query regarding how many images are associated with one or more keywords.

Accordingly, as shown by reference number 165, the recommendation system may execute the inquiry against the visual components that were indexed by the machine learning model (e.g., as shown by reference number 160). For example, the recommendation system may use a data structure constructed by the machine learning model that associates identifiers (e.g., indices) of visual components with keywords. As a result, the query may be executed faster than if the query were to be executed against the iconography database, which is a larger data structure.

As shown by reference number 170, the recommendation system may transmit, and the user device may receive, a response to the inquiry. For example, the recommendation system may transmit text and/or an image indicating an answer to the inquiry.

By using techniques as described in connection with FIGS. 1A-1D, the machine learning model recommends visual components from the iconography database while consuming less memory and processing resources than multiple keyword searches of the database. Additionally, the machine learning model provides for fast and accurate responses to inquiries about contents of the database.

As indicated above, FIGS. 1A-1D are provided as an example. Other examples may differ from what is described with regard to FIGS. 1A-1D.

Figure 2A:
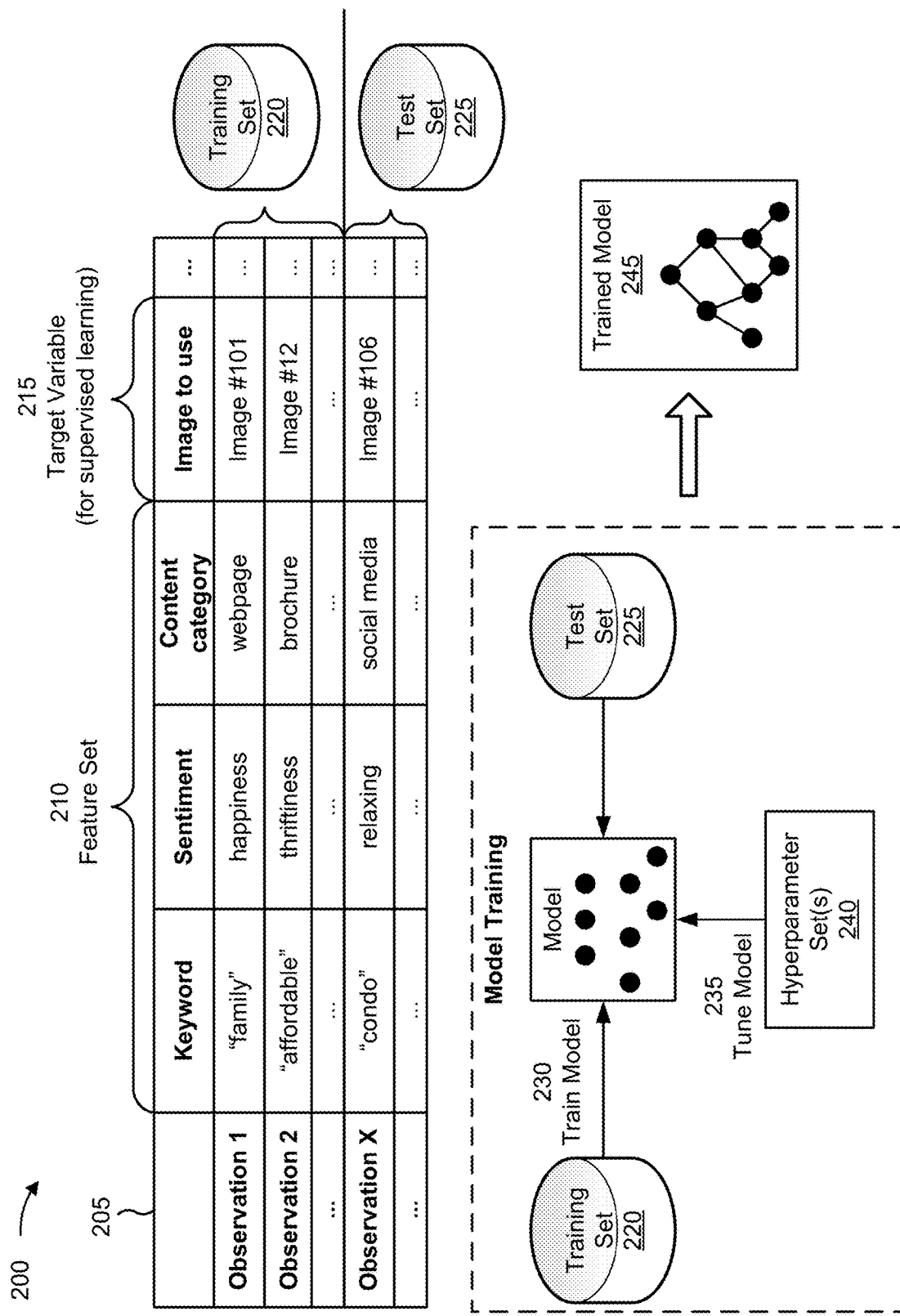
FIGS. 2A and 2B are diagrams of an example relating to training and applying a machine learning model in connection with iconography recommendations.
Figure 2B:
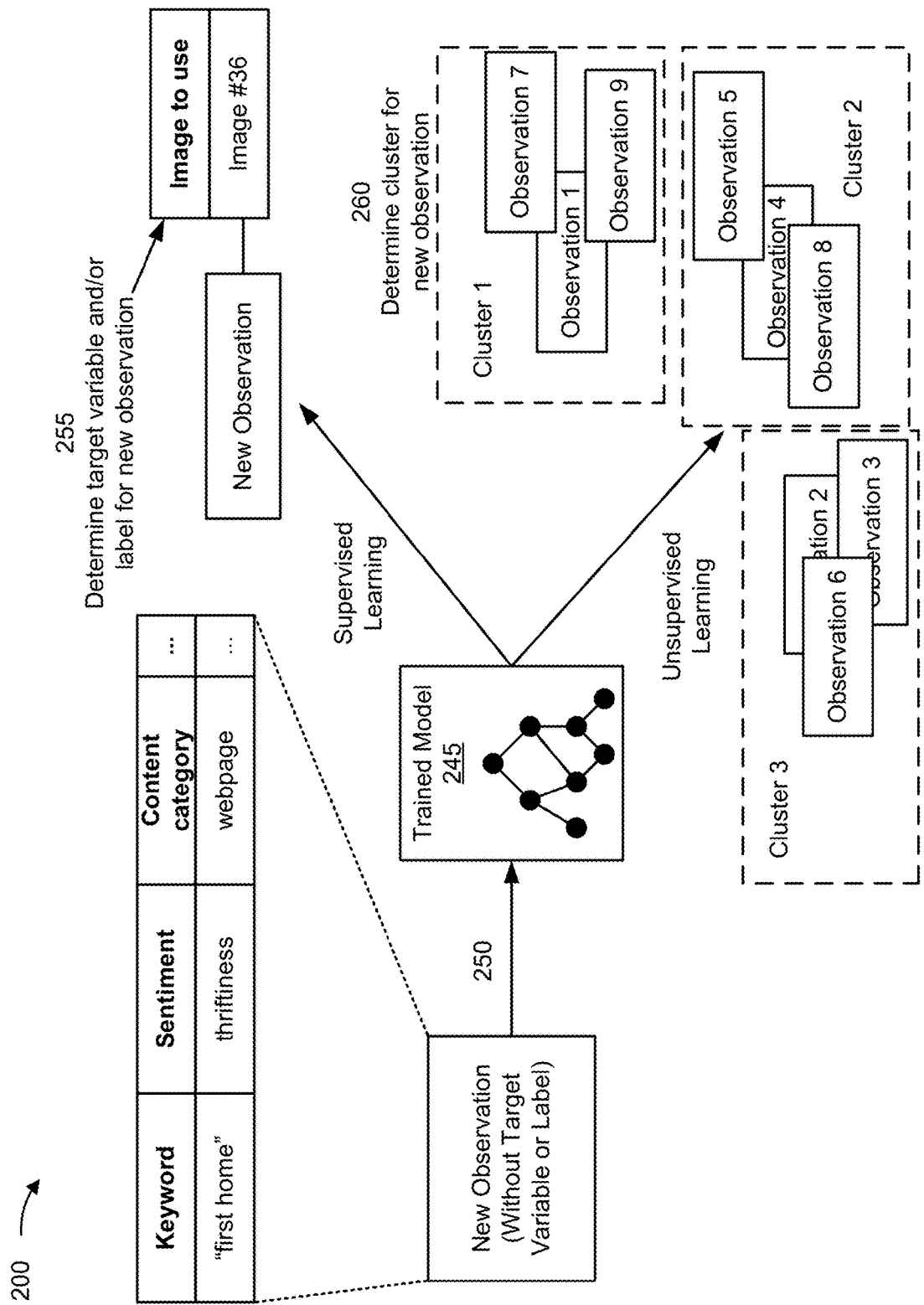

FIGS. 2A and 2B are a diagram illustrating an example 200 of training and applying a machine learning model in connection with iconography recommendations. The machine learning model training described herein may be performed using a machine learning system. The machine learning system may include or may be included in a computing device, a server, a cloud computing environment, or the like, such as a recommendation system or a user device described in more detail below.

As shown in FIG. 2A and by reference number 205, a machine learning model may be trained using a set of observations. The set of observations may be obtained and/or input from training data (e.g., historical data), such as data gathered during one or more processes described herein. For example, the set of observations may include data gathered from an iconography database, as described elsewhere herein. In some implementations, the machine learning system may receive the set of observations (e.g., as input) from a recommendation system.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from a recommendation system. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of keywords, a second feature of sentiment, a third feature of content category, and so on. As shown, for a first observation, the first feature may have a value of "family", the second feature may have a value of happiness (and/or a numerical score associated with happiness), the third feature may have a value of webpage, and so on. These features and feature values are provided as examples, and may differ in other examples. For example, the feature set may include one or more of the following features: parts of speech, portion of an organization, and/or text length, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is which image to use, which has a value of an image associated with index 101 for the first observation.

The feature set and target variable described above are provided as examples, and other examples may differ from what is described above. For example, for a target variable of which logo to use, the feature set may include a logo associated with a particular index. In another example, for a target variable of which color to use, the feature set may include a color associated with a particular hexadecimal code, red-green-blue (RGB) code, and/or other identifier. In another example, for a target variable of which template to use, the feature set may include a template associated with a particular index.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

FIG. 2B is a diagram illustrating applying a trained machine learning model to a new observation associated with iconography recommendations. The new observation may be input to a machine learning system that stores a trained machine learning model 245. The machine learning system may include or may be included in a computing device, a server, or a cloud computing environment, such as a recommendation system.

As shown by reference number 250, the machine learning system may receive a new observation (or a set of new observations), and may input the new observation to the machine learning model 245. As shown, the new observation may include a first feature of "first home", a second feature of thriftiness, a third feature of webpage, and so on, as an example. The machine learning system may apply the trained machine learning model 245 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 245 may predict a value of an image associated with index 36 for the target variable of which image to use for the new observation, as shown by reference number 255. Based on this prediction (e.g., based on the value having a particular label or classification or based on the value satisfying or failing to satisfy a threshold), the machine learning system may provide a recommendation and/or output for determination of a recommendation, such as a particular image to use, a particular logo to use, and/or a particular color to use. Additionally, or alternatively, the machine learning system may perform an automated action and/or may cause an automated action to be performed (e.g., by instructing another device to perform the automated action), such as generating an initial draft including a recommended image, a recommended logo, and/or a recommended color. In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 245 may classify (e.g., cluster) the new observation in a cluster, as shown by reference number 260. The observations within a cluster may have a threshold degree of similarity. As an example, if the machine learning system classifies the new observation in a first cluster (e.g., associated with one type of product), then the machine learning system may provide a first recommendation, such as visual components selected from a subset of components associated with that type of product. Additionally, or alternatively, the machine learning system may perform a first automated action and/or may cause a first automated action to be performed (e.g., by instructing another device to perform the automated action) based on classifying the new observation in the first cluster, such as generating an initial draft including visual components selected from that subset of components. As another example, if the machine learning system were to classify the new observation in a second cluster (e.g., associated with a different type of product), then the machine learning system may provide a second (e.g., different) recommendation (e.g., visual components selected from a subset of components associated with that type of product) and/or may perform or cause performance of a second (e.g., different) automated action, such as generating an initial draft including visual components selected from that subset of components.

In this way, the machine learning system may apply a rigorous and automated process to generating iconography recommendations. The machine learning system enables recognition and/or identification of tens, hundreds, thousands, or millions of features and/or feature values for tens, hundreds, thousands, or millions of observations, thereby increasing accuracy and consistency and reducing delay associated with extracting visual components to use from an iconography database relative to requiring computing resources to be allocated for tens, hundreds, or thousands of manual searches of the iconography database using the features or feature values.

As indicated above, FIGS. 2A-2B are provided as an example. Other examples may differ from what is described in connection with FIGS. 2A-2B. For example, the machine learning model may be trained using a different process than what is described in connection with FIGS. 2A-2B. Additionally, or alternatively, the machine learning model may employ a different machine learning algorithm than what is described in connection with FIGS. 2A-2B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
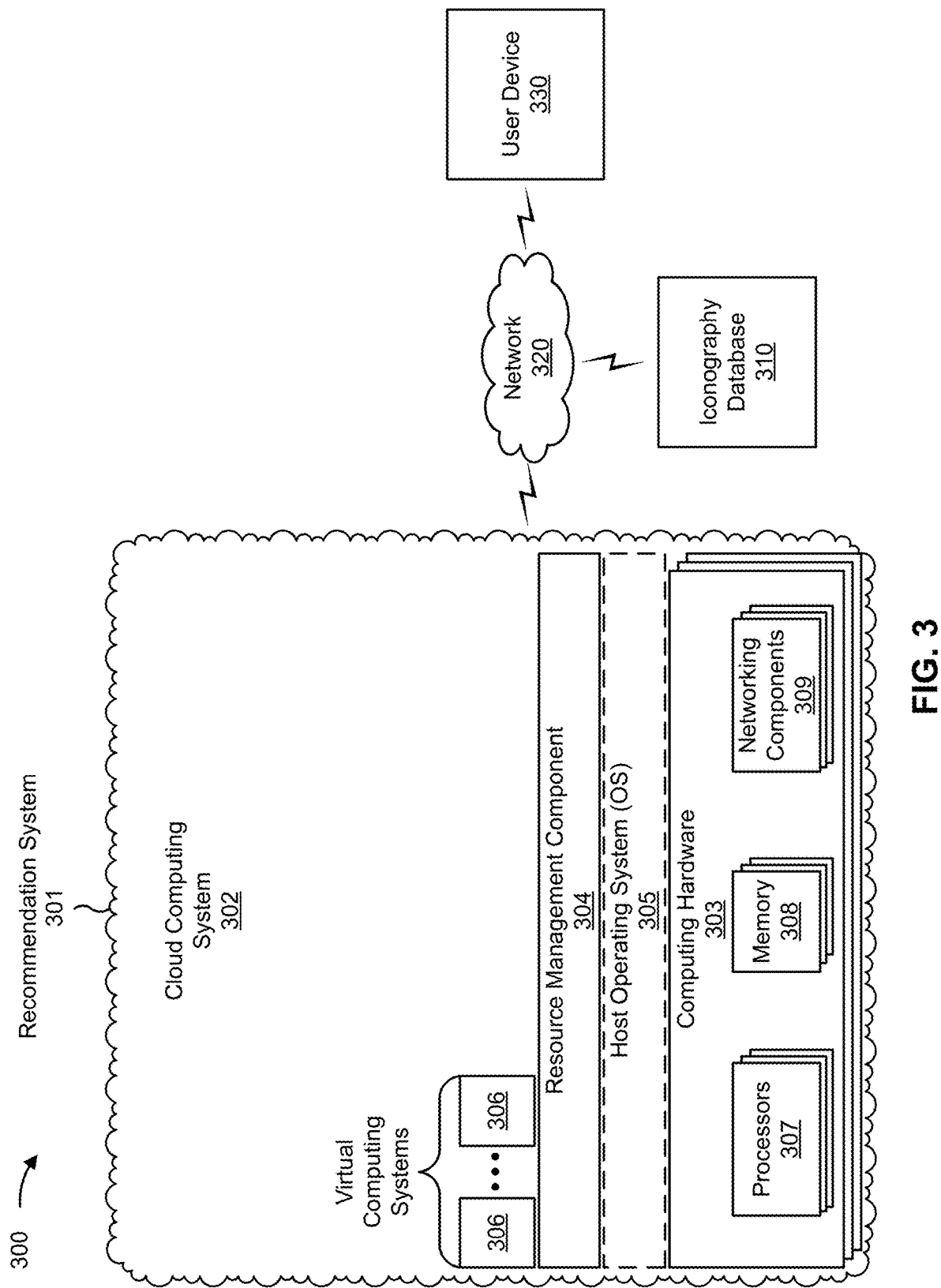
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a recommendation system 301, which may include one or more elements of and/or may execute within a cloud computing system 302. The cloud computing system 302 may include one or more elements 303-306, as described in more detail below. As further shown in FIG. 3, environment 300 may include an iconography database 310, a network 320, and a user device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines. Additionally, or alternatively, the resource management component 304 may include a container manager, such as when the virtual computing systems 306 are containers. In some implementations, the resource management component 304 executes within and/or in coordination with a host operating system 305.

A virtual computing system 306 includes a virtual environment that enables cloud-based execution of operations and/or processes described herein using computing hardware 303. A virtual computing system 306 may execute one or more applications using a file system that includes binary files, software libraries, and/or other resources required to execute applications on a guest operating system (e.g., within the virtual computing system 306) or the host operating system 305.

Although the recommendation system 301 may include one or more elements 303-306 of the cloud computing system 302, may execute within the cloud computing system 302, and/or may be hosted within the cloud computing system 302, in some implementations, the recommendation system 301 may not be cloud-based (e.g., may be implemented outside of a cloud computing system) or may be partially cloud-based. For example, the recommendation system 301 may include one or more devices that are not part of the cloud computing system 302, such as device 400 of FIG. 4, which may include a standalone server or another type of computing device. The recommendation system 301 may perform one or more operations and/or processes described in more detail elsewhere herein.

The iconography database 310 may be implemented on a cloud computing system at least partially integrated with cloud computing system 302 (e.g., as computing hardware 303) or distinct from cloud computing system 302 (e.g., as a standalone server). In some implementations, the iconography database 310 may include one or more devices (e.g., one or more servers) that are not part of a cloud computing system, such as device 400 of FIG. 4, which may include a standalone server or another type of computing device. The iconography database 310 may store visual components, such as images, colors, and/or logos, that are associated with an organization that owns (or at least has access to) the iconography database 310, as described elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The user device 330 may include one or more devices capable of using the recommendation system 301 to receive recommended visual components based on text. The user device 330 may include a communication device. For example, the user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 330 may communicate with the recommendation system 301 to determine visual components to use with text, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
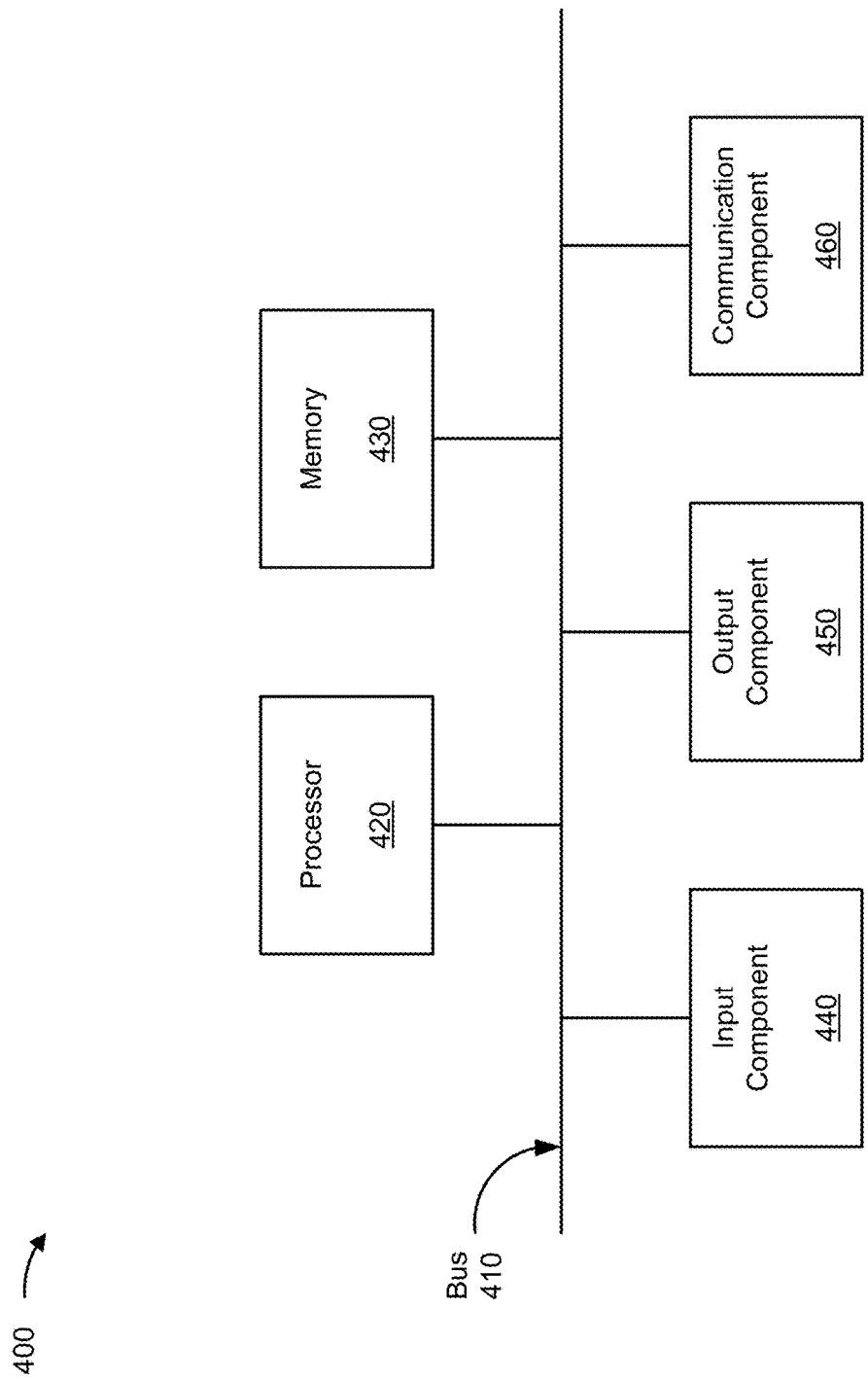
FIG. 4 is a diagram of example components of one or more devices of FIG. 3.

FIG. 4 is a diagram of example components of a device 400, which may correspond to an authentication system and/or a mobile device. In some implementations, an authentication system and/or a mobile device include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
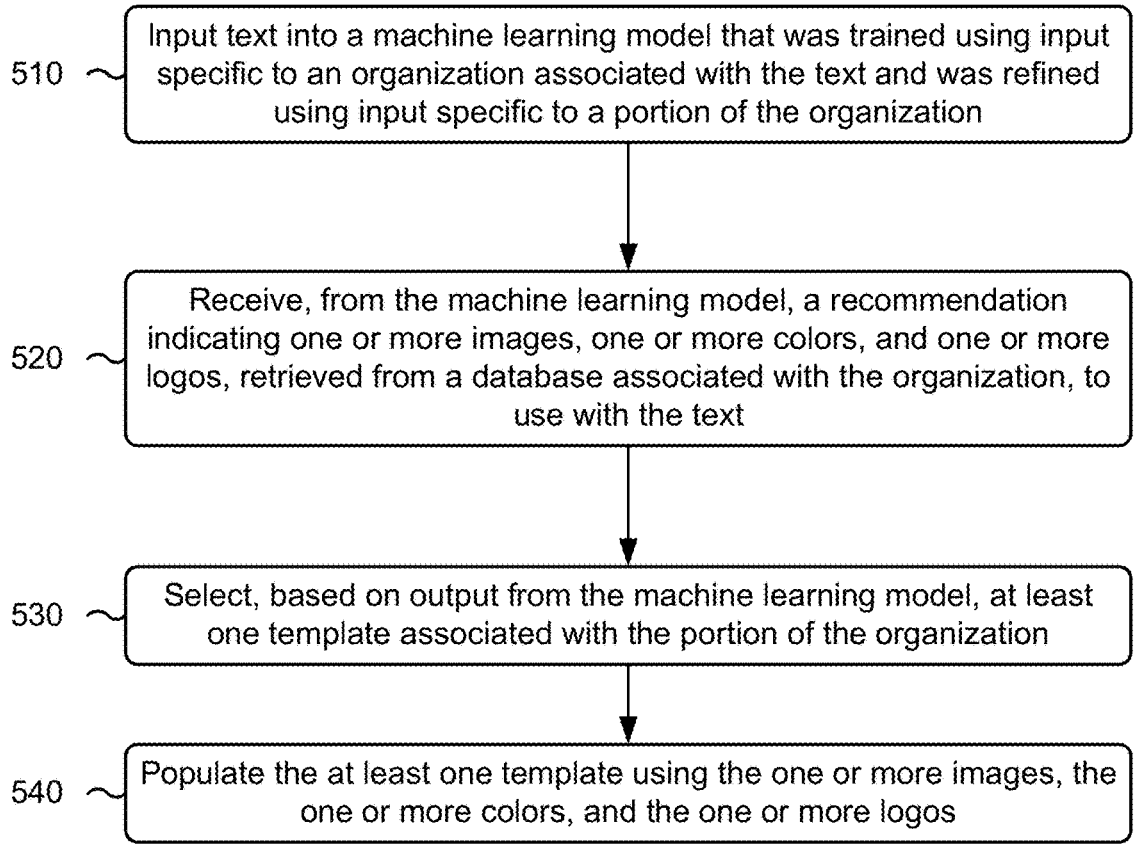
FIG. 5 is a flowchart of an example process relating to using machine learning for iconography recommendations.

FIG. 5 is a flowchart of an example process 500 associated with using machine learning for iconography recommendations. In some implementations, one or more process blocks of FIG. 5 may be performed by a system (e.g., recommendation system 301). In some implementations, one or more process blocks of FIG. 5 may be performed by another device or a group of devices separate from or including the system, such as iconography database 310 and/or user device 330. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include inputting text into a machine learning model that was trained using input specific to an organization associated with the text (block 510). In some implementations, the machine learning model was refined using input specific to a portion of the organization. As further shown in FIG. 5, process 500 may include receiving, from the machine learning model, a recommendation indicating one or more visual components (e.g., one or more images, one or more colors, and/or one or more logos) that are retrieved from a database associated with the organization to use with the text (block 520). In some implementations, the machine learning model uses at least NLP and sentiment detection to parse the text. As further shown in FIG. 5, process 500 may include selecting, based on output from the machine learning model, at least one template associated with the portion of the organization (block 530). Accordingly, as shown in FIG. 5, process 500 may include populating the at least one template using the one or more visual components (block 540).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for visual content generation using machine learning, the system comprising:
  one or more memories; and
  one or more processors, communicatively coupled to the one or more memories, configured to:
    input into a machine learning model:
      text received from a user,
      a category of content for at least one template that is to be used with the text, and
      a sentiment associated with the at least one template, wherein the machine learning model was trained using a set of observations specific to an organization associated with the text, the set of observations including at least a feature associated with sentiment detection and a feature associated with a content category, and
wherein the machine learning model was refined using input specific to a portion of the organization;
receive, from the machine learning model, a recommendation indicating one or more images, one or more colors, and one or more logos to use with the text in populating the at least one template in association with the portion of the organization, wherein the one or more images, the one or more colors, and the one or more logos are retrieved from a database associated with the organization, and wherein the machine learning model uses at least natural language processing (NLP) and sentiment detection to parse the text;
select, based on output from the machine learning model, the at least one template associated with the portion of the organization; and
populate the at least one template using the one or more images, the one or more colors, the one or more logos, and the text.

2. The system of claim 1, wherein the machine learning model further uses vectors that are at least partially unique to the organization.

3. The system of claim 1, wherein the machine learning model further uses vectors that are at least partially unique to the portion of the organization.

4. The system of claim 1, wherein the one or more processors are further configured to:
generate the at least one template based on the input specific to the portion of the organization.

5. The system of claim 1, wherein the one or more processors, to select the at least one template, are configured to:
receive an indication of the category of content; and
select the at least one template based on the indication of the category.

6. The system of claim 5, wherein the one or more processors, to select the at least one template, are further configured to:
select the at least one template based on at least one of the input specific to the organization or the input specific to the portion of the organization.

7. A method of visual content generation using machine learning, comprising:
inputting into a machine learning model:
text received from a user,
a category of content for an initial draft that is to be used with the text, and
a sentiment associated with the initial draft,
wherein the machine learning model was trained using a set of observations specific to an organization associated with the text, the set of observations including at least a feature associated with sentiment detection and a feature associated with a content category;
receiving, from the machine learning model, a recommendation indicating one or more visual components to use with the text in generating the initial draft, wherein the one or more visual components are stored in a database associated with the organization;
receiving the one or more visual components from the database; and
generating the initial draft including the text and the one or more visual components.

8. The method of claim 7, further comprising:
receiving feedback associated with the initial draft; and
updating the machine learning model based on the initial draft and the feedback.

9. The method of claim 7, wherein the one or more visual components include at least an image, a color, a logo, or a combination thereof.

10. The method of claim 7, further comprising:
applying one or more keywords to each visual component stored in the database, wherein the machine learning model generates the recommendation using the one or more keywords.

11. The method of claim 7, wherein the machine learning model is trained using one or more vectors associated with text included in the content specific to the organization.

12. The method of claim 7, wherein the machine learning model is trained using deep learning on text included in the content specific to the organization.

13. The method of claim 7, further comprising:
receiving an inquiry associated with the database; and
transmitting a response to the inquiry using indices applied by the machine learning model.

14. A non-transitory computer-readable medium storing a set of instructions for visual content generation using machine learning, the set of instructions comprising:
one or more instructions that, when executed by one or more processors of a device, cause the device to:
input into a machine learning model:
text received from a user,
a category of content for an initial draft that is to be used with the text, and
a sentiment associated with the initial draft,
wherein the machine learning model was trained using a set of observations specific to an organization associated with the text, the set of observations including at least a feature associated with sentiment detection and a feature associated with a content category;
receive, from the machine learning model, a recommendation indicating one or more visual components to use with the text in generating the initial draft, wherein the one or more visual components are stored in a database associated with the organization, and wherein the machine learning model uses at least one constraint associated with equal representation;
receive the one or more visual components from the database; and
generate the initial draft including the text and the one or more visual components.

15. The non-transitory computer-readable medium of claim 14, wherein the at least one constraint is based, at least in part, on previous outputs from the machine learning model.

16. The non-transitory computer-readable medium of claim 15, wherein the machine learning model is a recurrent neural network.

17. The non-transitory computer-readable medium of claim 14, wherein the machine learning model further uses at least one constraint associated with a compliance rule.

18. The non-transitory computer-readable medium of claim 14, wherein the machine learning model further uses at least one constraint associated with the organization.

19. The non-transitory computer-readable medium of claim 14, wherein the content specific to the organization comprises content that pairs text with images, colors, logos, or a combination thereof.

20. The non-transitory computer-readable medium of claim 14, wherein the one or more instructions, that cause the device to generate the initial draft, cause the device to:
   insert the text into at least a first position on the initial draft; and
   insert the one or more visual components into at least a second position on the initial draft.

\* \* \* \* \*